(12) United States Patent
Moors

(10) Patent No.: US 9,505,182 B2
(45) Date of Patent: Nov. 29, 2016

(54) SYSTEM AND METHOD FOR MANUFACTURE OF AIRFOIL COMPONENTS

(71) Applicant: General Electric Company, Schenectady, NY (US)

(72) Inventor: Thomas Michael Moors, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 345 days.

(21) Appl. No.: 14/195,073

(22) Filed: Mar. 3, 2014

(65) Prior Publication Data
US 2016/0009034 A1    Jan. 14, 2016

(51) Int. Cl.
| | |
|---|---|
| *B29C 70/48* | (2006.01) |
| *B29C 70/54* | (2006.01) |
| *B29D 99/00* | (2010.01) |
| *B29K 101/10* | (2006.01) |
| *B29K 105/08* | (2006.01) |
| *B29L 31/08* | (2006.01) |

(52) U.S. Cl.
CPC .............. *B29C 70/542* (2013.01); *B29C 70/48* (2013.01); *B29D 99/0028* (2013.01); *B29K 2101/10* (2013.01); *B29K 2105/08* (2013.01); *B29L 2031/08* (2013.01); *Y02E 10/722* (2013.01)

(58) Field of Classification Search
CPC .................. B29C 43/3642; B29C 2043/3649; B29C 2043/3644; B29C 70/542
See application file for complete search history.

(56) References Cited

U.S. PATENT DOCUMENTS

| | | | |
|---|---|---|---|
| 1,822,270 A * | 9/1931 | Bunch ..................... | B23P 19/00 244/119 |
| 3,902,944 A | 9/1975 | Ashton et al. | |
| 7,811,495 B2 * | 10/2010 | Dagher ................. | B29C 33/505 264/228 |
| 8,348,618 B2 | 1/2013 | Hartman | |
| 8,424,805 B2 | 4/2013 | Smith | |
| 8,444,792 B2 | 5/2013 | Ossanai | |
| 2002/0106469 A1 * | 8/2002 | Fanucci ................. | B29C 70/083 428/36.9 |
| 2009/0250847 A1 * | 10/2009 | Burchardt ........... | B29C 33/0061 264/511 |
| 2013/0075025 A1 | 3/2013 | Guitton | |

FOREIGN PATENT DOCUMENTS

DE    WO 2012007160 A2 *    1/2012    ........... B29C 70/086

OTHER PUBLICATIONS

European Search Report issued in connection with corresponding EP Application No. 15156697.3 on Aug. 21, 2015.

* cited by examiner

*Primary Examiner* — Matthew Daniels
(74) *Attorney, Agent, or Firm* — Ernest G. Cusick; Hoffman Warnick LLC

(57) ABSTRACT

Embodiments of the present disclosure relate generally to systems and methods for manufacturing an airfoil component. The system can include: a geometrical mold; an elongated flexible sleeve having a closed-off interior and positioned within the geometrical mold, wherein the elongated flexible sleeve is further positioned to have a desired geometry; an infusing channel in fluid communication with the closed-off interior of the elongated flexible sleeve and configured to communicate a resinous material thereto; a vacuum channel in fluid communication with the closed-off interior of the elongated flexible sleeve and configured to vacuum seal the closed-off interior of the elongated flexible sleeve; and a glass fiber layer positioned within the closed-off interior of the elongated flexible sleeve.

9 Claims, 5 Drawing Sheets

SYSTEM AND METHOD FOR MANUFACTURE OF AIRFOIL COMPONENTS

STATEMENT REGARDING FEDERAL RIGHTS

This invention was made with government support under contract number DE-AR0000293 awarded by the U.S. Department of Energy. The government has certain rights in the invention.

BACKGROUND OF THE INVENTION

The subject matter disclosed herein relates to the manufacture of airfoil components, including those used in aircraft and power generation applications. More specifically, the present disclosure relates to a system and method for the manufacture of airfoil components.

Some aircraft and/or power plant systems, for example certain jet aircraft, nuclear, simple cycle and combined cycle power plant systems, wind turbines employ turbines in their design and operation. Some of these turbines include one or more stages of buckets which are exposed to fluid flows during operation. Each bucket can include a base supporting a respective airfoil, such as a turbine blade, configured to aerodynamically interact with and extract work from fluid flow (e.g., creating thrust, driving machinery, converting thermal energy to mechanical energy, etc.) as part of, for example, power generation. As a result of this interaction and conversion, the geometry of these airfoil components can affect system and turbine operation, performance, thrust, efficiency, and power. Geometrical design considerations also affect the performance of airfoils and similar components in other contexts.

Manufacturing airfoils and other components can be more costly and time-consuming where the airfoil is large and includes a complex or "composite geometry." As described herein, a "composite" geometry refers to a continuous shape composed of several sub-sections, each of which may have a simple shape (e.g., straight line, arc, etc.) and large sizes. In a conventional process, different sub-sections of the airfoil may be molded and manufactured separately before being bonded together to form a composite geometry. Other conventional techniques may also include forming airfoil components by shaping individual metal laminations and then combining them into the desired shape.

BRIEF DESCRIPTION OF THE INVENTION

At least one embodiment of the present disclosure is described herein with reference to the manufacture of airfoil components. However, it should be apparent to those skilled in the art and guided by the teachings herein that embodiments of the present disclosure are applicable to any scenario in which manufactured components can otherwise be formed by conventional molding.

A first aspect of the present disclosure provides a system for manufacturing an airfoil component. The system can include: an elongated flexible sleeve having a closed-off interior and positioned within a geometrical mold, wherein the elongated flexible sleeve is further positioned to have a desired geometry; an infusing channel in fluid communication with the closed-off interior of the elongated flexible sleeve and configured to communicate a resinous material thereto; a vacuum channel in fluid communication with the closed-off interior of the elongated flexible sleeve and configured to vacuum seal the closed-off interior of the elongated flexible sleeve; and a glass fiber layer positioned within the closed-off interior of the elongated flexible sleeve.

A second aspect of the present disclosure provides a method of manufacturing an airfoil component, the method comprising: shaping an elongated flexible sleeve to have a desired geometry, wherein a glass fiber layer is enclosed within the elongated flexible sleeve; vacuum-sealing the elongated flexible sleeve; infusing a resinous material into the vacuum-sealed elongated flexible sleeve, wherein the infused resinous material substantially takes the shape of the desired geometry; and curing the resinous material.

A third aspect of the present disclosure provides a system for manufacturing an airfoil component having a desired geometry, the system comprising: an elongated flexible sleeve having a first end, a second end, and a closed-off interior, wherein the elongated flexible sleeve is configured to have a desired geometry; an infusing channel coupled to the first end of the elongated flexible sleeve and in fluid communication with the closed-off interior of the elongated flexible sleeve, wherein the infusing channel is configured to communicate a liquid-based resinous material to the closed-off interior of the elongated flexible sleeve; a vacuum channel coupled to the second end of the elongated flexible sleeve and in fluid communication with the closed-off interior of the elongated flexible sleeve, wherein the vacuum channel is configured to vacuum-seal the closed-off interior of the elongated flexible sleeve; a pultruded composite member configured to have the desired geometry and positioned within the closed-off interior of the elongated flexible sleeve; and a glass fiber layer positioned adjacent to the pultruded composite member and positioned within the closed-off interior of the elongated flexible sleeve.

BRIEF DESCRIPTION OF THE DRAWING

These and other features of the disclosed apparatus will be more readily understood from the following detailed description of the various aspects of the apparatus taken in conjunction with the accompanying drawings that depict various embodiments of the invention, in which.

It is noted that the drawings are not necessarily to scale. The drawings are intended to depict only typical aspects of the disclosure, and therefore should not be considered as limiting its scope. In the drawings, like numbering represents like elements between the drawings.

DETAILED DESCRIPTION OF THE INVENTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely exemplary.

Embodiments of the present disclosure include systems and methods for manufacturing an airfoil component. An airfoil component manufactured according to the present disclosure may have a complex or "composite" geometry. Systems according to the present disclosure can include, for example, an elongated flexible sleeve positioned inside of a geometrical mold. The elongated flexible sleeve can include a closed-off interior, and may be in the shape of a desired geometry. As used herein, the term "closed-off" can refer to any structure which is mechanically sealed or isolated from other regions or structures by any currently known or later developed sealing structure. A "closed-off" structure can be coupled to other structures for fluid communication, if desired, with other structures discussed herein, such as infusing and/or vacuum sealing channels. An infusing channel for providing a resinous material to the closed-off interior of the elongated flexible sleeve may be in fluid communication with the elongated flexible sleeve. Similarly, a vacuum channel can be in fluid communication with the closed-off interior of the elongated flexible sleeve. A glass fiber layer, which can form part of the resulting airfoil component's structure, may be positioned within the closed-off interior of the elongated flexible sleeve. Methods of forming an airfoil component, which can use embodiments of the systems described herein, are also discussed.

Figure 1:
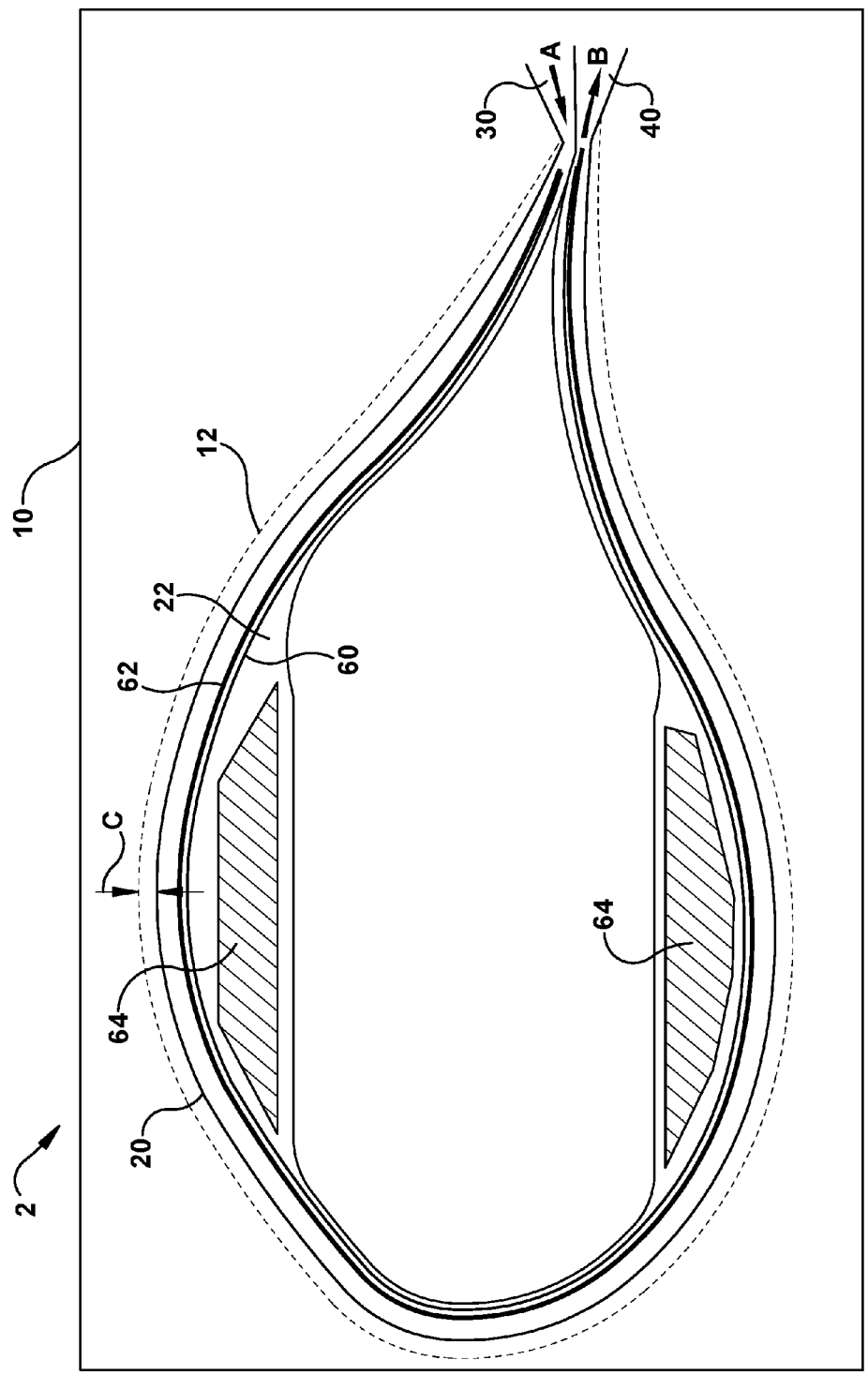
FIG. 1 is a top-down view of a system according to an embodiment of the present disclosure.

Turning to FIG. 1, an example system 2 for manufacturing an airfoil component is shown. A geometrical mold 10 can be substantially planar and may be composed of a molded, machined, or similarly customizable material, e.g., a plastic, metal, etc., which can be created or made available. The surface of geometrical mold 10 can accommodate the desired size of airfoil components manufactured with system 2. For example, an airfoil component with a particular chord width and chord length can be manufactured in system 2 where geometrical mold 10 has a greater length and width than the airfoil component to be manufactured. To accommodate and/or receive other components discussed herein, portions of geometrical mold 10 can be etched away, carved out, entrenched, etc. to create a desired geometry. As an example, a recessed region 12 can be formed within geometrical mold 10 by any currently known or later developed process. Further, recessed region 12 can be substantially in the shape of the airfoil component to be manufactured with system 10, e.g., an "airfoil chord" or an "airfoil rib."

System 2 can include an elongated flexible sleeve 20 positioned within or upon geometrical mold 10. Elongated flexible sleeve 20 can be composed of, for example, a plastic or other flexible material capable of holding various types of solid and liquid materials. In an embodiment, elongated flexible sleeve 20 can be in the form a single sheet that is joined together to create a tube structure. Thus, elongated flexible sleeve 20 can include one or more sealed plastic sheets folded into a sleeve-type shape with a closed-off interior 22. Elongated flexible sleeve 20 can be positioned, adjusted, etc. within geometrical mold 10 to have the geometry of an airfoil component such as an airfoil rib. In an embodiment, elongated flexible sleeve 20 can take the shape of the desired geometry by substantially fitting inside of recessed region 12 and being positioned therein.

One end of elongated flexible sleeve 20 can be in fluid communication with an infusing channel 30 connected to an external supply (not shown) of resinous material. Infusing channel 30 can be in the form of a sleeve, tube, pipe, tunnel, or other component capable of delivering a liquid-based substance. Resinous materials which may be delivered from infusing channel 30 can include, for example, liquid-based resinous materials. More specifically, materials delivered from infusing channel 30 can include thermal plastics and/or thermal setting polymers. "Thermal plastics" can include liquid-based resinous materials which can cure into a solid state and return to a liquid-based state when heated. "Thermal setting polymers," in contrast, include liquid-based resinous materials which cure into a solid state, and can remain solid after being reheated. Thus, resinous materials communicated from infusing channel 30 can initially be in a liquid-based form, but may cure into a solid state after setting over time within elongated flexible sleeve 20 and being held at a particular temperature. As an example, some resinous materials may cure at room temperature after being set for a particular length of time. The resinous materials entering elongated flexible sleeve 20 can flow along the direction of phantom arrow A shown within infusing channel 30.

Another end of elongated flexible sleeve 20 can be in fluid communication with a vacuum channel 40. Vacuum channel 40 can also be in the form of a sleeve, tube, pipe, tunnel, or any currently known or later developed fluid delivery component connected to closed-off interior 22 of elongated flexible sleeve 20. Vacuum channel 40 can be coupled to, for example, a vacuum component (not shown) capable of vacuuming air and/or other gases out of elongated flexible sleeve 20 to vacuum seal closed-off interior 22 of elongated flexible sleeve 40. Further, as resinous materials are delivered to elongated flexible sleeve 20 from infusing channel 30, vacuum sealing from vacuum channel 40 can also pull the resinous materials through elongated flexible sleeve 20, causing the materials to exit through vacuum channel 40 along the direction of phantom arrow B. As a result, infusing channel 30 and vacuum channel 40 together can introduce resinous materials and/or other substances to closed-off interior 22 of elongated flexible sleeve 20. Although infusing channel 30 and vacuum channel 40 are shown by example herein as being positioned at opposite ends, it is understood that each channel can be in fluid communication with other regions of elongated flexible sleeve 20.

Figure 2:
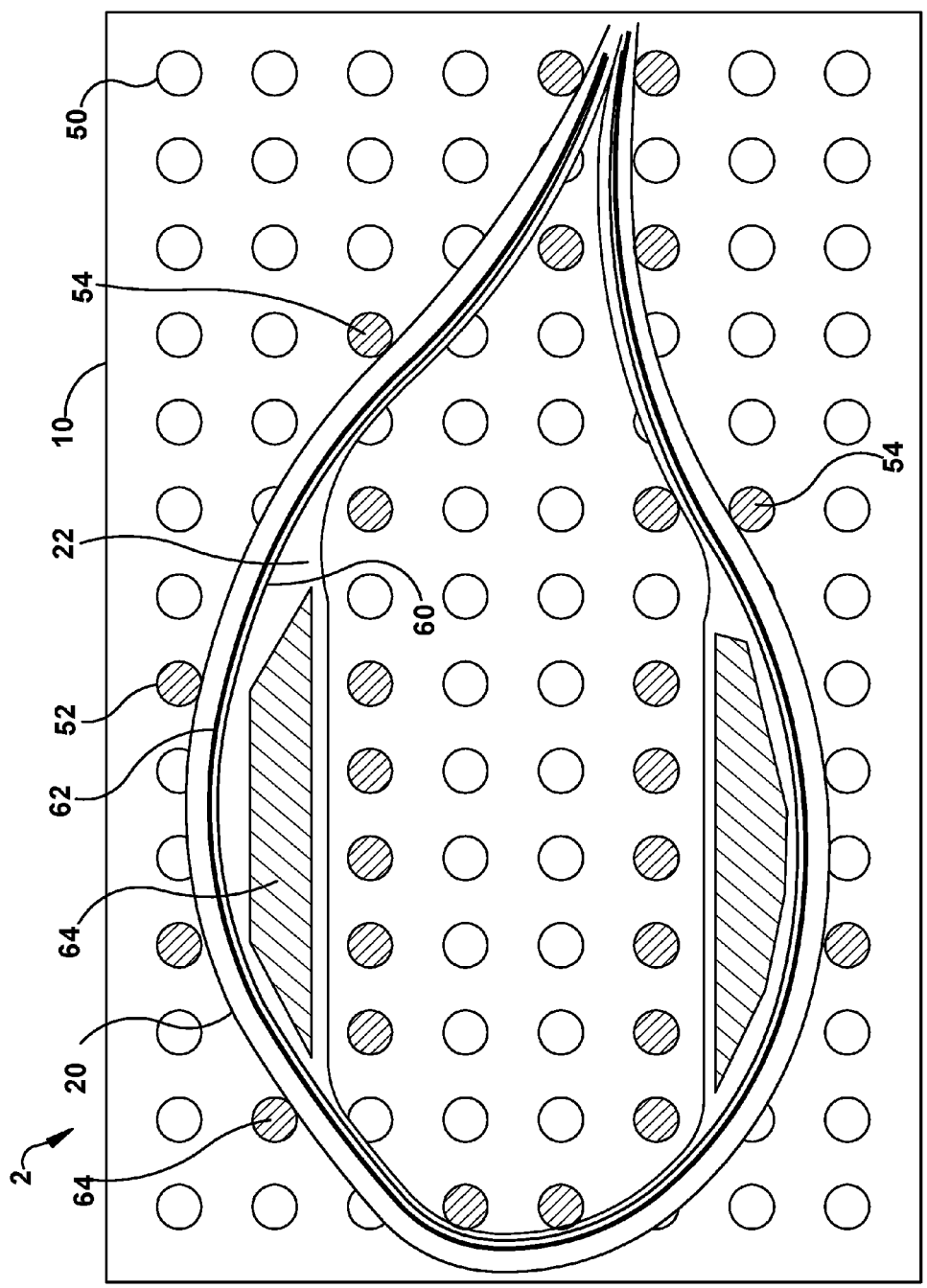
FIG. 2 is a top-down view of a system with a peg-based geometrical mold according to an embodiment of the present disclosure.

Referring to FIG. 2, a peg-based version of geometrical mold 10 which can be used with system 2 is shown. Geometrical mold 10 can be in the form of a substantially planar sheet, surface, etc. with several peg holes 50 being located thereon in any desired arrangement. Although peg holes 50 are shown by example in FIG. 2 as being in a grid-type arrangement, it is understood that peg holes 50 may also be arranged in any desired manner, such as in the shape of particular airfoil components. Pegs 52 can be inserted into peg holes 50 to create a substantial profile of the desired geometry, e.g., the profile of an airfoil component, similar to the effect of recessed region 12 (FIG. 1). Elongated flexible sleeve 20 can be positioned between pegs 52 and shaped into the desired geometry. To manufacture airfoil components with different geometries, some pegs 52 can be added, removed, moved to a different location, etc. Further, at least one angled peg 54, oriented at a non-perpendicular angle relative to geometrical mold 10, can be used in embodiments of the present disclosure. Angled peg 54 can project from geometrical mold 10 at a predetermined angle to define a complex geometry for elongated flexible sleeve 20 and airfoil components manufactured with embodiments of system 2. For example, angled peg 54 can create airfoil components with contoured profiles, as may be desired in the exterior of an airfoil component. Angled peg 54 can be oriented at various predetermined angles to change the exterior contour of airfoil components manufactured with system 2.

Referring to FIG. 1 and FIG. 2 together, structural materials can be added to an airfoil component with embodiments of system 2. As one example, a glass fiber layer 60 may be positioned within elongated flexible sleeve 20 using any currently known or later developed process. For example, a user or manufacturing instrument can enclose and seal glass fiber layer 60 within a flexible material, e.g., a plastic or other transparent flexible material, to form elongated flexible sleeve 20. As a further example, a user or manufacturing instrument can slide glass fiber layer 60 and/or other desired components into a pre-existing elongated flexible sleeve 20. Thus, glass fiber layer 60 can substantially be in the shape of the desired geometry when positioned within closed-off interior 22 of elongated flexible sleeve 20. The present disclosure contemplates adding other materials and structures to closed-off interior 22 of elongated flexible sleeve 20 as discussed herein. In particular, system 2 can allow glass fiber layer 60 to be part of the structure of manufactured airfoil components. In embodiments of system 2, one or more continuous glass fiber layers 60 can be added to the structure of an airfoil component with a composite geometry, without the airfoil component being molded or manufactured in separate pieces.

One approach for shaping elongated flexible sleeve 20 into a desired geometry can include placing a pultruded composite member 62 within closed-off interior 22 of elongated flexible sleeve 20. Pultruded composite member 62 can be a flexible material composed of, e.g., a cured resinous material or other structural fiber capable of being bent into a particular shape. Pultruded composite member 62 can bend when placed inside of a particular sleeve, but can also "spring" back into its original shape when removed from the sleeve. Once formed into the shape of the desired geometry, pultruded composite member 62 can be substantially in the shape of the resulting airfoil component. Pultruded composite member 62 within elongated flexible sleeve 20 can have a particular length and/or height, and for example can be as small as ten millimeters in length or height, or as large as a meter in length or height. In an embodiment, pultruded composite member 62 can include a fibrous material such as a carbon-based glass (E-glass, S-glass, R-glass, etc.) bonded with a matrix of epoxy or a similar material. Thus, pultruded composite member 62 may be in the form of a composite fiber or another type of solid, pre-cured resinous material. Pultruded composite member 62 can be placed flexibly within geometrical mold 10 and elongated flexible sleeve 20 to form a substantial profile of the desired geometry. Pultruded composite member 62 can be enclosed within elongated flexible sleeve 20 simultaneously with glass fiber layer 60 if desired, e.g., by placing pultruded composite member 62 onto a material which is sealed around pultruded composite member 62 to form elongated flexible sleeve 20. Alternatively, pultruded composite member can be slidably inserted into closed-off interior 22 of a pre-existing elongated flexible sleeve 20 through infusing channel 30 or vacuum channel 40. Glass fiber layer 60 can rest against pultruded composite member 62 while an airfoil component is manufactured with system 2. A "prepreg" material could also be used, which for example can include a partially cured composite material.

System 2 can also include a stiffening material 64 positioned within elongated flexible sleeve 20, which can be in the form of a core for "stiffening" the component that a laminate panel. Stiffening material 64 also can create mating surfaces for attachment of the larger blade component. Stiffening material 64 can be added to elongated flexible sleeve 20 by any of the processes described herein for adding a material to closed-off interior 22 of elongated flexible sleeve 20, or by any other currently known or later developed process. As one example, stiffening material 64 can be sealed within elongated flexible sleeve 20 at the time elongated flexible sleeve 20 is formed, which may be simultaneous with glass fiber layer 60 and/or pultruded composite member 62. In another example, a user or machine can slide, pump, infuse, or otherwise mechanically insert stiffening material 64 into closed-off interior 22 of a pre-existing elongated flexible sleeve 20 through infusing channel 30 or vacuum channel 40. Stiffening material 64 can be composed of a rigid material capable of being used in the structure of an airfoil component, e.g., a cured resinous material, a metal, a composite material, etc. Stiffening material 64 can cause glass fiber layer 60 and/or pultruded composite member 62 to traverse a predefined cross-section in closed-off interior 22 of elongated flexible sleeve 20, e.g., an outer region. Enclosing stiffening material 64 within elongated flexible sleeve 20 can allow a user to customize the geometry of glass fiber layer 60 and/or pultruded composite material 62 to a greater degree than with geometrical mold 10 alone.

Figure 3:
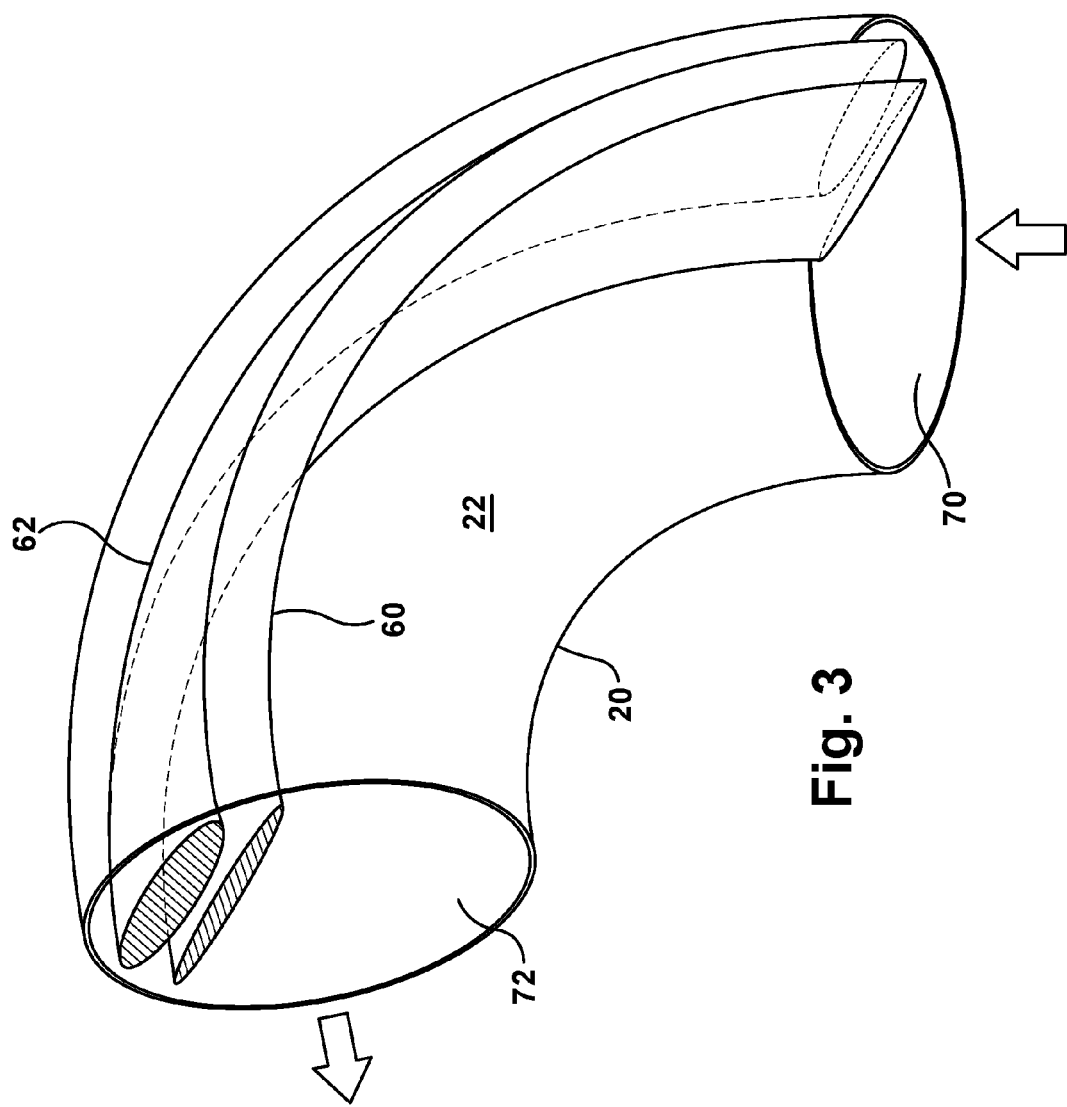
FIG. 3 is a partial cut away view of an elongated flexible sleeve used in a system and method according to an embodiment of the present disclosure.

An example arrangement of glass fiber layer 60, pultruded composite member 62, and other components within elongated flexible sleeve 20 according to an embodiment of the invention is shown in FIG. 3. FIG. 3 includes a partial cut-away view of glass fiber layer 60 and pultruded composite member 62 within closed-off interior 22 of elongated flexible sleeve 20. Resinous material can pass through a curved section of elongated flexible sleeve 20 between a first area 70 and a second area 72. The example curved section of elongated flexible sleeve 20 in FIG. 3 is oriented relative to a center point C and separated therefrom by a distance marked with radius R. Along the curved section between first area 70 and second area 72, pultruded composite member 62 can be positioned radially distal to glass fiber layer 60 (i.e., further away from point C along radius R). As resinous material passes through the region of curvature, the flowing resinous material can push glass fiber layer 60 radially against pultruded composite member 62. The flowing resinous material's pressure against glass fiber layer 60 and pultruded composite member 62 can reduce wrinkling, bending, etc. within glass fiber layer 60 by pressing glass fiber layer 60 against pultruded composite member 62. Thus, in a resulting airfoil component, pultruded composite member 62 can be oriented substantially toward the radially outer face of elongated flexible sleeve 20 (i.e., away from point C along radius R) while glass fiber layer 60 can be oriented substantially toward the radially inner face of elongated flexible sleeve 20. This arrangement of glass fiber layer 60 and pultruded composite member 62 can smoothen the exterior of the resulting airfoil component. Putting the pultruded composite member 62 on the outer face of elongated flexible sleeve 20 can result in a smooth surface similar to a mold. Additionally, there may be many other arrangements of fiber, pultrusion, prepreg, and/or other materials that can be stacked or arranged in various orders that may produce a desired shape and surface structure.

Figure 4:
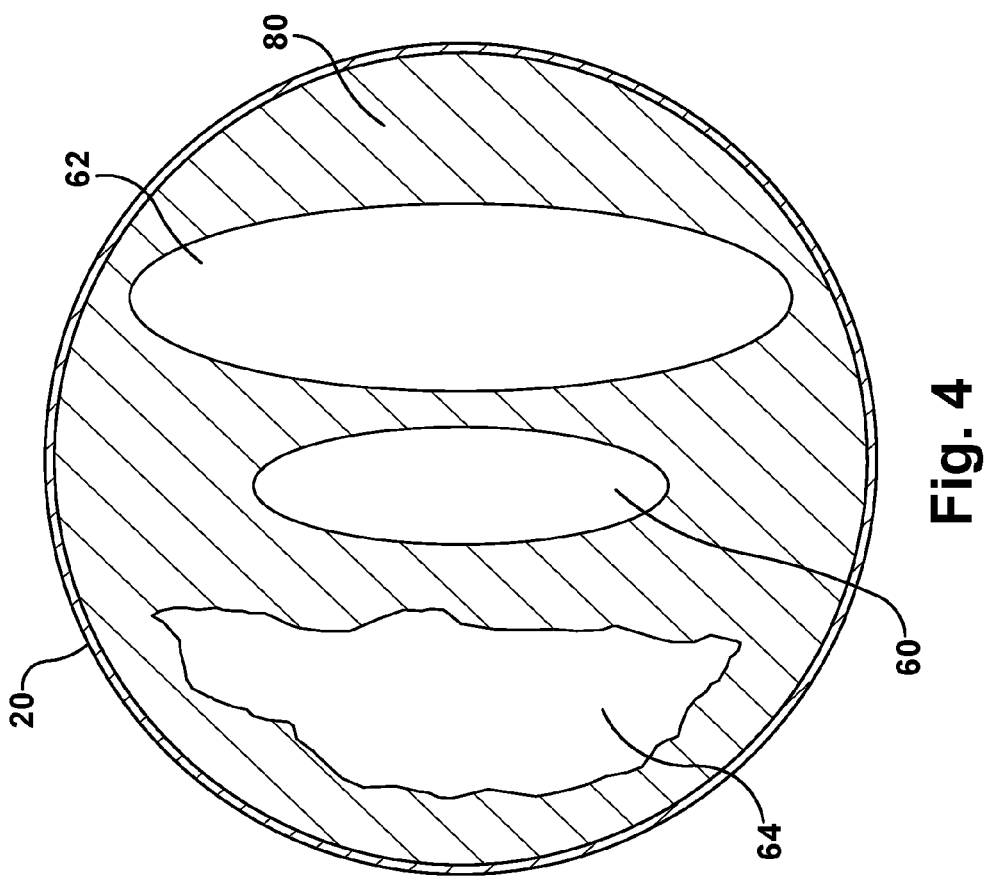
FIG. 4 is a cross-sectional view of an elongated flexible sleeve used in a system and method according to an embodiment of the present disclosure.

Turning to FIG. 4, a cross-sectional view of elongated flexible sleeve 20 demonstrates a method by which embodiment of the present disclosure can be used. Elongated flexible sleeve 20 can include glass fiber layer 60, pultruded composite member 62, and stiffening material 64. Once elongated flexible sleeve 20 and its contents are shaped into a desired geometry, a resinous material 80 can enter elongated flexible sleeve 20 from infusing channel 30 (FIG. 1) by any currently known or later developed process of introducing a liquid-based or resinous material (e.g., infusing, injecting, pumping, etc.). Infusing channel 30 (FIG. 1) can introduce resinous material 80 while vacuum channel 40 (FIG. 1) pulls resinous material 80 through elongated flexible sleeve 20. Resinous material 80 within elongated flexible sleeve 20 can take the shape of the desired geometry to form the manufactured airfoil component. Resinous material 80 can then cure into a solid state by any known or later developed process of curing, e.g., by keeping resinous material 80 inside of elongated flexible sleeve 20 over time at room temperature or any other predetermined temperature.

Figure 5:
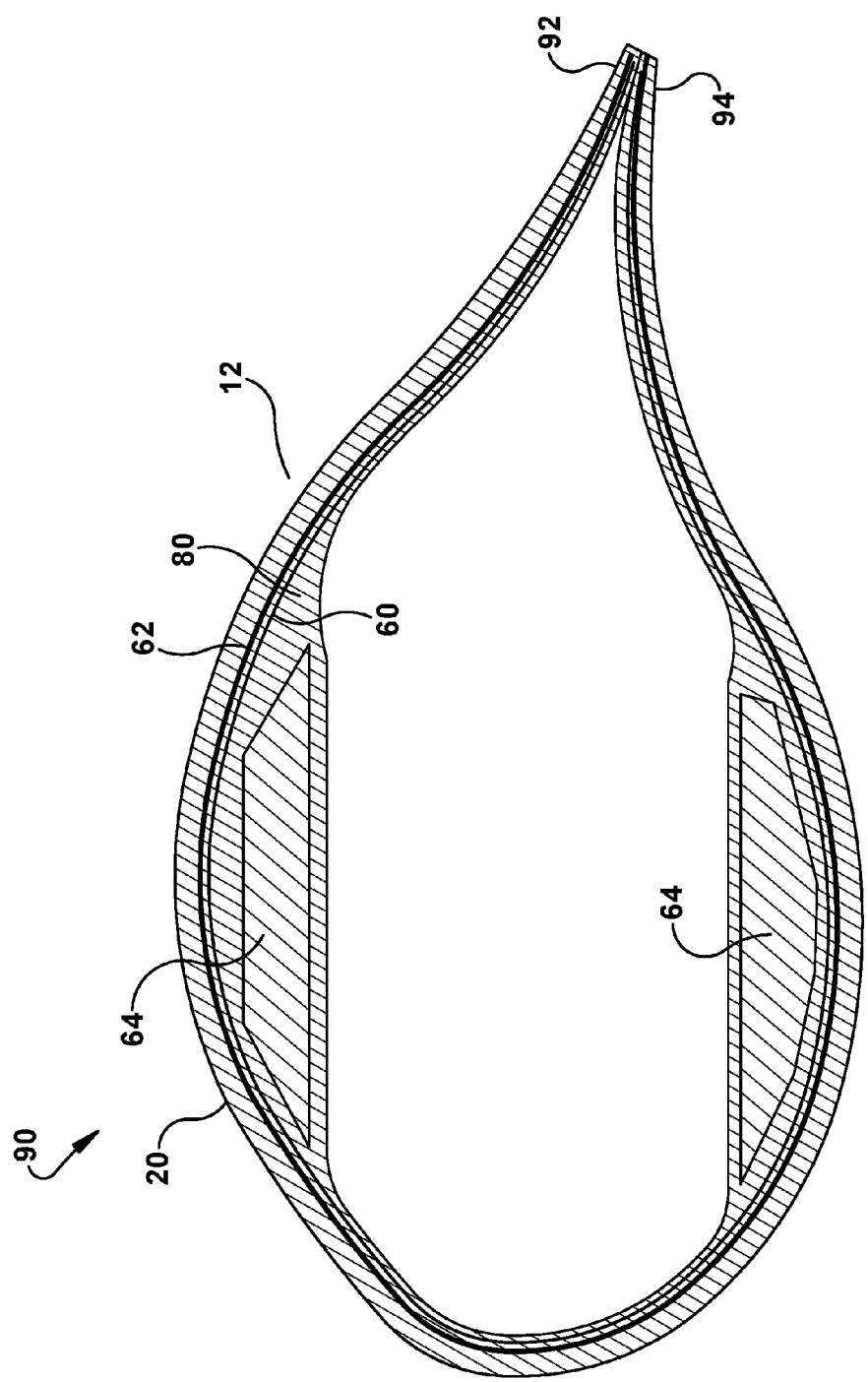
FIG. 5 is a top-down view of an airfoil component manufactured according to an embodiment of the present disclosure.

FIG. 5 demonstrates by way of example further processes for manufacturing an airfoil component. Resinous materials within closed-off interior 22 of elongated flexible sleeve 20 can cure around glass fiber layer 60 and other components therein to become an airfoil rib 90. Airfoil rib 90 can be removed from elongated flexible sleeve 20 and detached from infusing channel 30 (FIG. 1), vacuum channel 40 (FIG. 1) after the resinous material cures. Airfoil rib 90 is shown by example herein as having a composite geometry with a first end 92 coupled to a second end 94. First end 92 and second end 94 may correspond to the points where elongated flexible sleeve was coupled to infusing channel 30 (FIG. 1) and vacuum channel 40 (FIG. 1). Alternatively, first end 92 and second end 94 may be located in other areas of airfoil rib 90 unrelated to the original position of infusing channel 30 (FIG. 1) and vacuum channel 40 (FIG. 1) in other embodiments. Following the manufacturing of airfoil rib 90, first end 92 and second end 94 may not be coupled together. First end 92 and second end 94 of airfoil rib 90 can be bonded together, for example, by using an epoxy adhesive, a polyurethane adhesive, a methyl acrylate adhesive, a mechanical process such as bolting, scarf joint etc. In addition, first end 92 and second end 94 can be bonded together by any currently known or later developed bonding process. As a result, first end 92 and second end 94 can bond together to form an airfoil rib having the desired geometry. In embodiments of the present disclosure where a complete airfoil rib is manufactured, the remainder of the airfoil can be formed by any currently known or later developed process, e.g., by inserting an I-beam (not shown) or box-beam (not shown) through the cross section of airfoil rib 90, and/or coupling airfoil rib 90 to other structural materials.

The various embodiments discussed herein can offer several technical and commercial advantages. For example, the systems and methods discussed herein can allow composite or highly variable airfoil geometries to be manufactured quickly. In addition, the present disclosure can reduce the costs associated with forming individual molds for subsections of an airfoil and bonding each of those subsections together because a continuous airfoil component can be fabricated. As examples, the present disclosure contemplates manufacturing airfoil components which may include concave and convex sections, or composite shapes made up of several simple shapes. Further, the manufacturing methods and systems also provide a solution for manufacturing various airfoil components with glass fiber layers being contained therein.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for manufacturing a turbine blade, the system comprising:
    an elongated flexible sleeve having a closed-off interior and positioned within a geometrical mold, wherein the elongated flexible sleeve is further positioned to have a desired geometry including a leading edge portion and a trailing edge portion, and wherein the geometrical mold further comprises a plurality of pegs in contact with the elongated flexible sleeve, the plurality of pegs being configured to shape the elongated flexible sleeve into the desired geometry;
    an infusing channel in fluid communication with the closed-off interior of the elongated flexible sleeve and configured to communicate a resinous material thereto at the trailing edge portion of the desired geometry;
    a vacuum channel in fluid communication with the closed-off interior of the elongated flexible sleeve and configured to vacuum seal the closed-off interior of the elongated flexible sleeve at the trailing edge portion of the desired geometry, such that the infusing channel is positioned directly adjacent to the vacuum channel; and
    a glass fiber layer positioned within the closed-off interior of the elongated flexible sleeve.

2. The system of claim 1, further comprising a stiffening material positioned within the closed-off interior of the elongated flexible sleeve.

3. The system of claim 1, wherein the infusing channel is further configured to communicate a thermal setting polymer to the closed-off interior of the elongated flexible sleeve.

4. The system of claim 1, further comprising a pultruded composite member configured to have the desired geometry and positioned within the closed-off interior of the elongated flexible sleeve.

5. The system of claim 4, wherein the pultruded composite member comprises a composite fibrous material.

6. The system of claim 4, wherein the desired geometry includes at least one region of curvature, and the pultruded composite member is positioned radially distal to the glass fiber layer throughout the at least one region of curvature.

7. The system of claim 1, wherein one of the plurality of pegs projects from the geometrical mold at a non-perpendicular angle with respect to the geometrical mold.

8. A system for manufacturing a turbine blade, the system comprising:
    an elongated flexible sleeve positioned within a geometrical mold, the elongated flexible sleeve having a first end, a second end, and a closed-off interior, wherein the elongated flexible sleeve is configured to have a desired geometry including a leading edge portion and a trailing edge portion for the turbine blade, and wherein the geometrical mold further comprises a plurality of pegs in contact with the elongated flexible sleeve, the plurality of pegs being configured to shape the elongated flexible sleeve into the desired geometry;

an infusing channel coupled to the first end of the elongated flexible sleeve at the trailing edge portion of the desired geometry and in fluid communication with the closed-off interior of the elongated flexible sleeve, wherein the infusing channel is configured to communicate a liquid-based resinous material to the closed-off interior of the elongated flexible sleeve;

a vacuum channel coupled to the second end of the elongated flexible sleeve at the trailing edge portion of the desired geometry and in fluid communication with the closed-off interior of the elongated flexible sleeve, wherein the vacuum channel is configured to vacuum-seal the closed-off interior of the elongated flexible sleeve, wherein the infusing channel is positioned directly adjacent to the vacuum channel proximal to the trailing edge portion;

a pultruded composite member having first and second opposing ends, the pultruded composite member being configured to have the desired geometry and positioned within the closed-off interior of the elongated flexible sleeve such that the first and second opposing ends are proximal to the trailing edge portion; and a glass fiber layer positioned adjacent to the pultruded composite member and positioned within the closed-off interior of the elongated flexible sleeve.

9. The system of claim 8, wherein the desired geometry includes at least one region of curvature, and the pultruded composite member is positioned radially distal to the glass fiber layer throughout the at least one region of curvature.

* * * * *